(12) United States Patent
Hoppert (10) Patent No.: US 8,070,365 B2
(45) Date of Patent: Dec. 6, 2011

(54) ADJUSTABLE VEHICLE DRIVELINE MOUNT

(76) Inventor: David John Hoppert, Woodburn, OR (US)

( * ) Notice: Subject to any disclaimer, the term of this patent is extended or adjusted under 35 U.S.C. 154(b) by 955 days.

(21) Appl. No.: 12/072,391

(22) Filed: Feb. 25, 2008

(65) Prior Publication Data

US 2009/0214149 A1    Aug. 27, 2009

(51) Int. Cl.
*B60K 17/24* (2006.01)
(52) U.S. Cl. .......... 384/535; 384/257; 180/380
(58) Field of Classification Search .......... 384/247, 384/252, 253, 257–260, 535, 581, 583; 180/379, 180/381
See application file for complete search history.

(56) References Cited

U.S. PATENT DOCUMENTS

| | | | | |
|---|---|---|---|---|
| 113,744 A | * | 4/1871 | Couch | 384/259 |
| 671,550 A | * | 4/1901 | Hallowell | 384/259 |
| 867,291 A | * | 10/1907 | Mointyre | 384/259 |
| 1,472,236 A | * | 10/1923 | Ahara | 384/259 |
| 5,172,985 A | * | 12/1992 | Constancio | 384/536 |
| 5,370,464 A | * | 12/1994 | Blaha | 384/252 |
| 5,562,179 A | * | 10/1996 | McAdam | 180/379 |
| 6,345,680 B1 | * | 2/2002 | Hill | 180/376 |

\* cited by examiner

*Primary Examiner* — James Pilkington
*Assistant Examiner* — Thomas Diaz
(74) *Attorney, Agent, or Firm* — Mark S. Hubert (57) ABSTRACT

A generally hollow three element boxed mounting bracket adapted to hold a carrier bearing assembly within it's central cavity and be mechanically affixed to a frame member of a vehicle. The three elements forming the boxed structure each have slotted orifices that align to allow the passage of mechanical fasteners. The relative positioning of the individual bracket elements allows for adjustment of the carrier bearing assembly in the X, Y and Z axes. The bracket also has two slotted orifices for the attachment of the carrier bearing assembly and allows for the attachment of all models of driveshaft carrier bearings.

7 Claims, 7 Drawing Sheets

ADJUSTABLE VEHICLE DRIVELINE MOUNT

BACKGROUND OF THE INVENTION

Many vehicles, mostly trucks, have aftermarket speciality suspension systems that raise the vehicle's body, frame, engine and transmission from the axles. This extra spacing allows larger tires to be utilized thereby increasing the vehicle's ground clearance. These tires and suspension offer distinct advantages for vehicles traversing off road terrains such as sand dunes, swamps, bogs, bush and the like. As the vertical distance between the transmission and the rear axle increases, so does the horizontal angle of the connecting driveshaft. The stock bracket that houses the driveshaft carrier bearing and stabilizes the driveshaft with respect to the vehicle's frame, is not adjustable and will not work with these "lifted" vehicles. A need for a low profile, three axis adjustable bracket that is adapted to house a stock carrier bearing and which may be may be affixed in a range of positions to the frame, would be a welcome fix to a well known industry problem.

Currently, the replacement and proper alignment of a driveline bracket is time consuming and at best only accurate. It usually entails fairly precise measurements and repeated modifications of the existing bracket. Finding a new location to mount the bracket on the frame is also often a challenge. Since the driveshaft's horizontal angle has increased, the height of the bracket may be increased or decreased depending if the bracket is relocated forward or rearward, if the bracket is angled, or a combination of these. Each vehicle has its own physical obstacles with bracket relocation and due to the plethora of lift heights available, numerous different proper relocation positions. Often precise bracket location requires a unique three axis adjustment of the bracket from its stock location. An improperly aligned bracket results in premature U joint wear and can lead to catastrophic failure. The adjustable driveline mount allows the original factory carrier bearing to be used, has a low height profile that allows for upward relocation of the carrier bearing, and has limited adjustment in all three axes. This new invention utilizes and combines both known and new technologies in a unique and novel configuration to fulfill an industry need and overcome the aforementioned problems of the prior art.

SUMMARY OF THE INVENTION

The general purpose of the present invention, which will be described subsequently in greater detail, is to provide a vehicle driveline mount that is capable of housing all models of driveshaft carrier bearings and that has adjustability in the X, Y and Z axes. It must be inexpensive to manufacture, sturdy, easy to adjust and mount in the vehicle frame's existing bolt holes.

It has many of the advantages mentioned heretofore and many novel features that result in a new improved adjustable vehicle driveline mount which is not anticipated, rendered obvious, suggested, or even implied by any of the prior art, either alone or in any combination thereof.

In accordance with the invention, an object of the present invention is to provide an improved driveline mount that is adapted for the replacement of a vehicle's stock counterpart for all "lifted" vehicles.

It is another object of this invention to provide an improved driveline mount that allows for numerous optional, functionally equivalent vehicle frame locations.

It is a further object of this invention to provide an improved driveline mount adapted for use with all styles of stock carrier bearings.

It is still a further object of this invention to provide for an improved driveline mount that has adjustability in all three axes.

It is yet a further object of this invention to provide for an improved driveline mount that can quickly and precisely be properly mated to all "lifted" vehicles.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The present invention provides a novel, three axis adjustable, mount (bracket) configuration that allows for the housing and precise location of a driveline's supporting carrier bearing upon the vehicle frame.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

For a thorough understanding of the importance and novelty of this invention, one must first understand how a driveshaft support works. Basically, a rigid bracket holds a carrier bearing and its pillow block housing (the carrier bearing assembly) below one of the vehicle frame members. Generally, since the driveshaft is located on the approximate longitudinal center of the vehicle, the bracket holds the carrier bearing assembly at right angles (normal) to the driveshaft and parallel to the vehicle's cross member. The location of the carrier bearing is such that the driveshaft (spanning between the transmission and the rear end) is supported as it passes through the center of the carrier bearing. This prevents wobble in the shaft therein reducing transmitted vibration. When the vehicle is "lifted" the horizontal angle of the driveshaft increases and the original carrier bearing is located too high. To maintain proper alignment of the driveshaft, the carrier bearing assembly must be adjusted, usually horizontally, vertically and angularly. The bracket that holds the carrier bearing assembly has limited frame member locations where it can be affixed. With the narrow mounting options the replacement bracket must have the flexibility for adjustment in the X, Y and Z axes. Reference to the X, Y and Z axes is to be taken with respect to the three dimensional standard (right handed) Cartesian Coordinate system as depicted in the axial vector diagram in FIG. 7.

Figure 1:
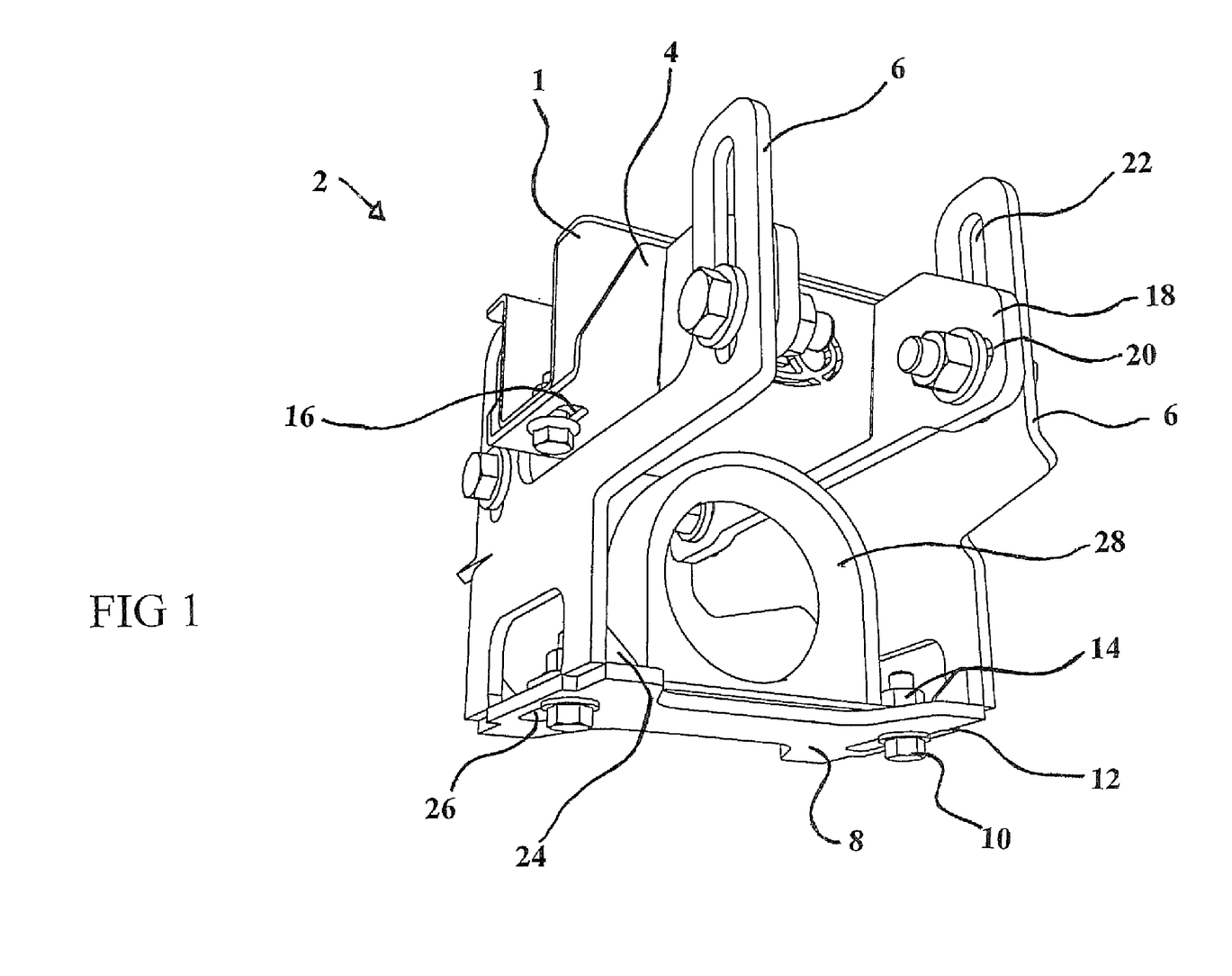
FIG. 1 is an angled side perspective view of the adjustable vehicle driveline mount.
Figure 2:
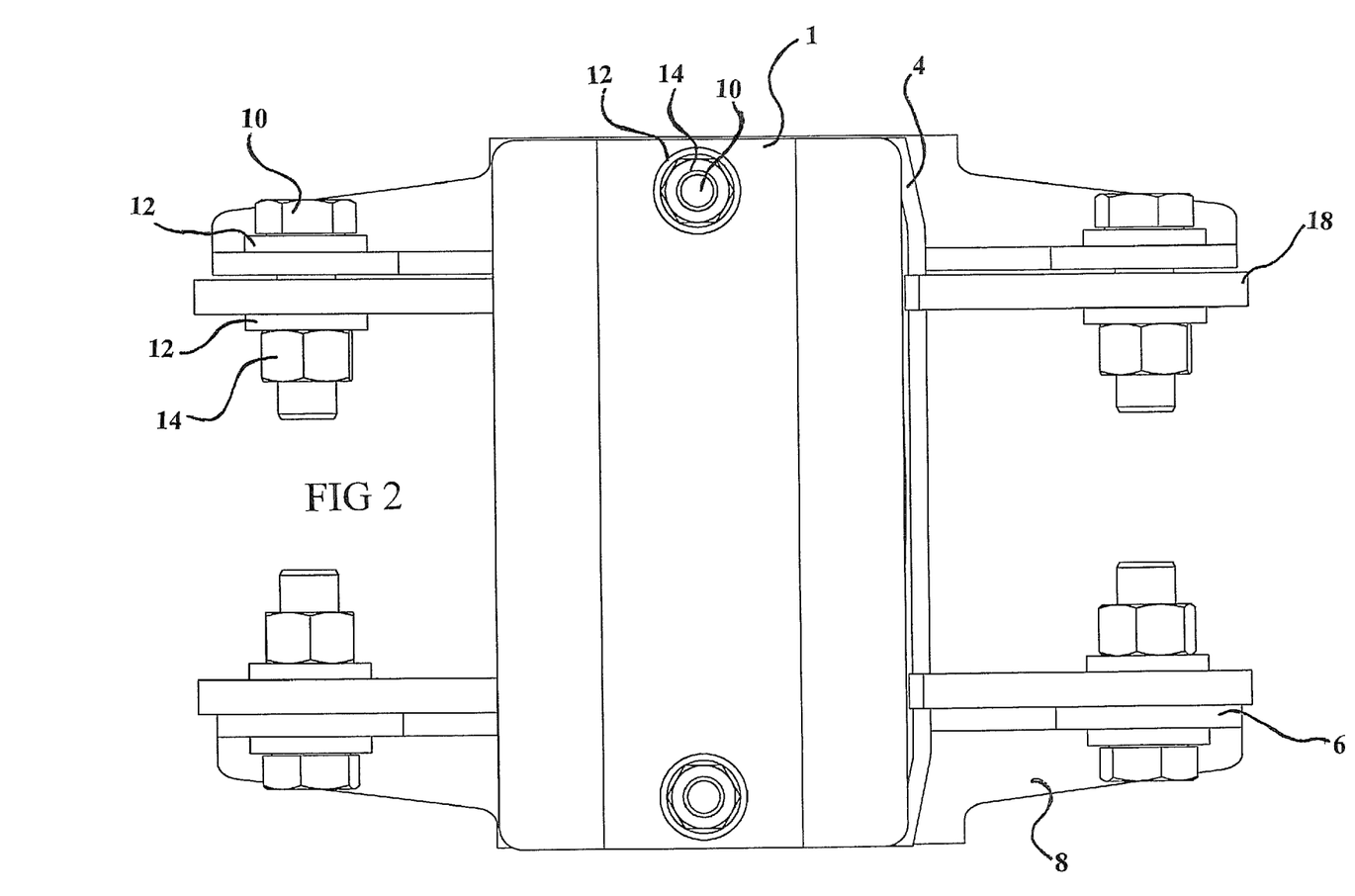
FIG. 2 is a top view of the adjustable vehicle driveline mount.
Figure 3:
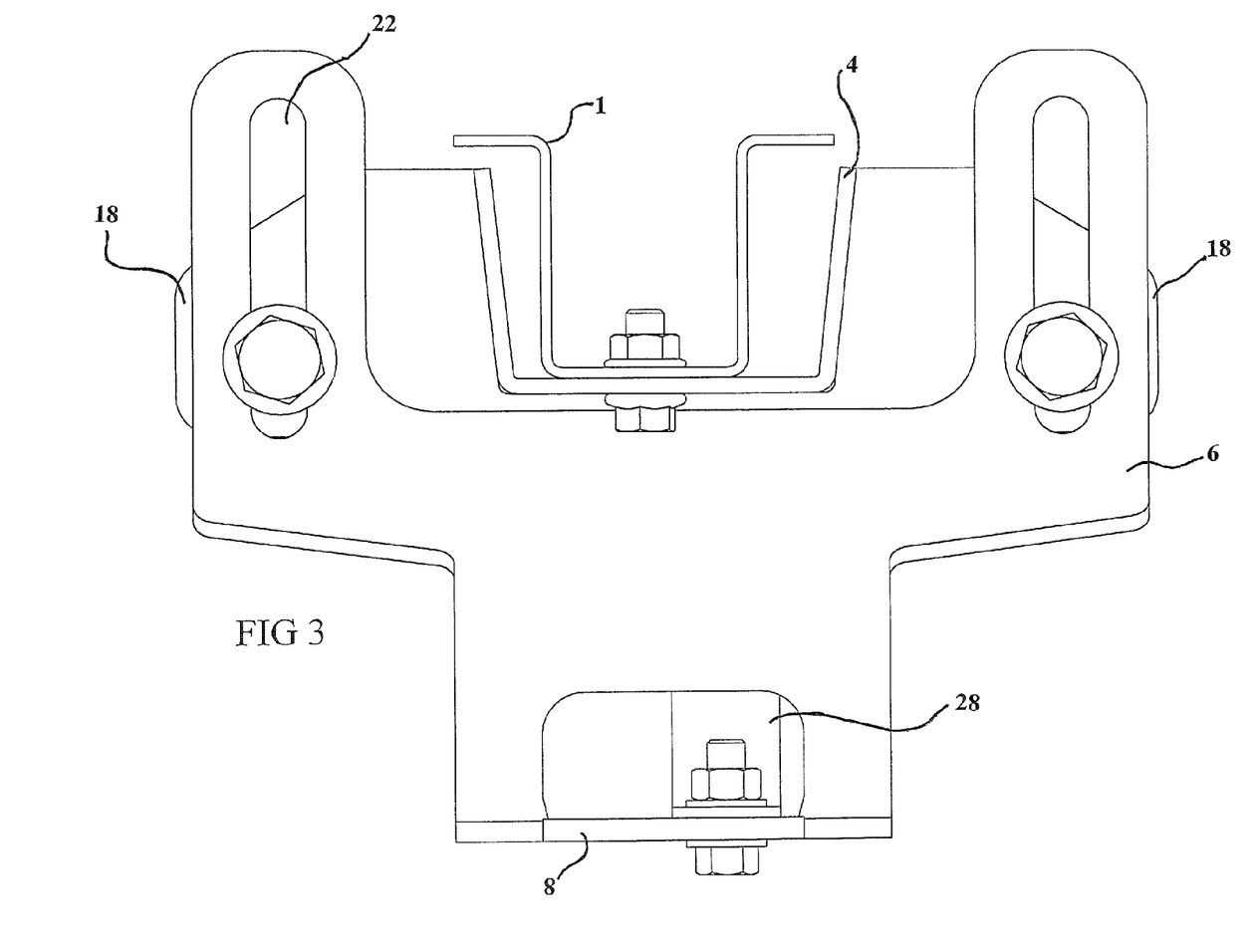
FIG. 3 is an end view of the adjustable vehicle driveline mount.
Figure 5:
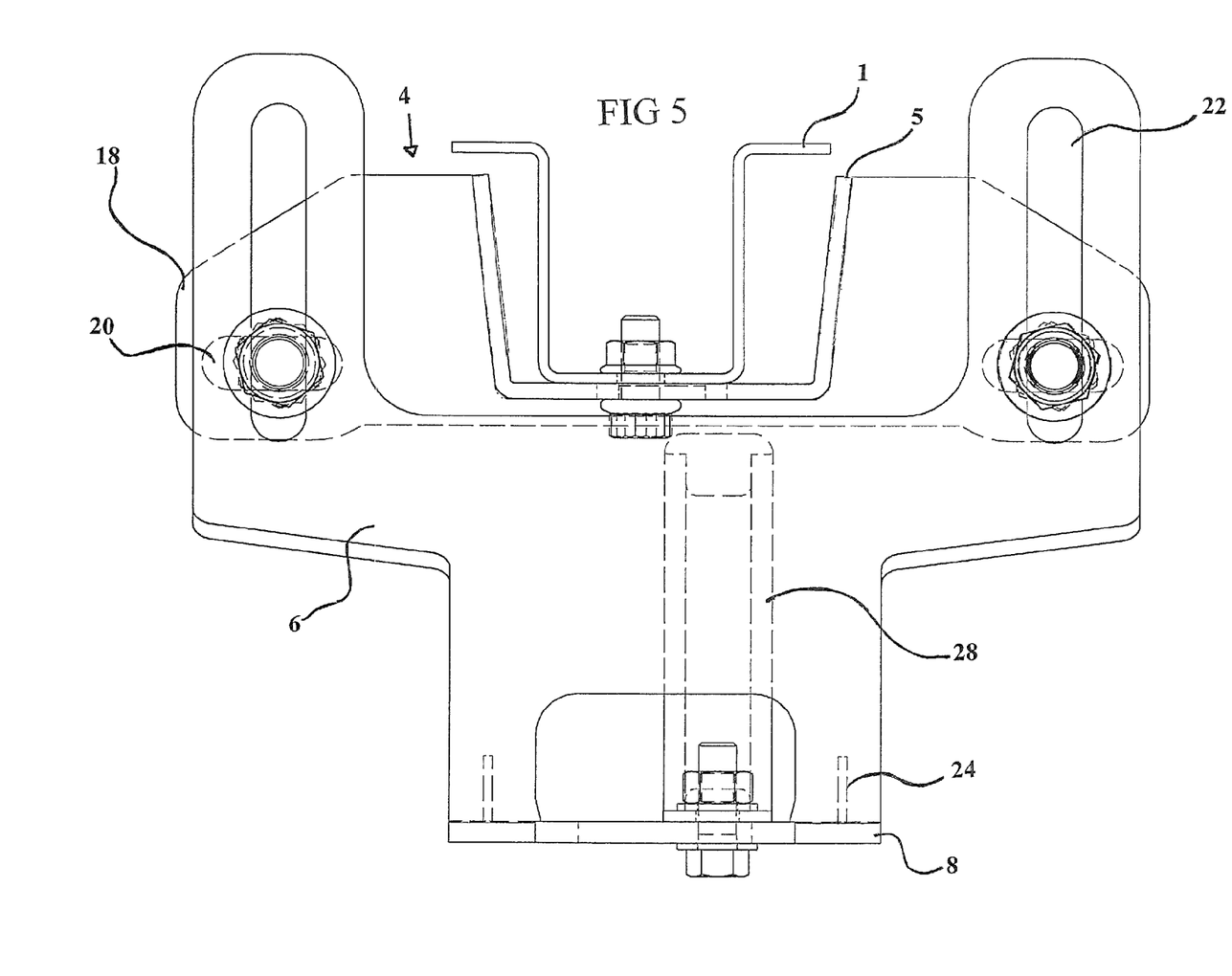
FIG. 5 is a phantom end view of the adjustable vehicle driveline mount.

Looking at FIG. 1 it can be seen that the vehicle driveline mount 2 is made up of a top plate 4 mechanically affixed to a cradle bracket that is comprised of two substantially similar side plates 6 mechanically affixed perpendicular to, and along the parallel edges of the bottom plate 8 so as to form a generally boxed configuration. A carrier bearing assembly 28 is connected to the bottom plate 8 by a bolt 10 washer 12 and nut 14 (a bolted assembly.) The top plate 4 has a U shaped channel member 5 that is wider but not deeper than standard vehicle frame rail cross members 1. (Ref FIGS. 2, 3 and 5) This facilitates the bolted connection between the frame rail cross member 1 and the top plate 4 as best illustrated in FIG. 2. There are two first elongated orifices 16 formed in the U shaped channel member 4 where the axis of elongation runs horizontally and perpendicular to the channel member's longitudinal axis and resides in the XY plane. (This elongation allows for the horizontal adjustment of the top plate 4 with respect to the cross member 1. This allows the longitudinal axis of the top plate 5 to be shifted with respect to the longitudinal axis of the cross member 1 as best illustrated in FIG. 3.)

To the U shaped channel member 5 there are two U shaped plates mechanically affixed so as to reside parallel to each other and extend normally from the channel member 5 so as to form a total of four connecting flanges 18 that extend perpendicular to the longitudinal axis of the channel member 5. There are second elongated orifices 20 in each of the connecting flanges 18. The axis of elongation runs horizontally and resides in the XZ plane. (This elongation in the second mounting holes allows for the horizontal adjustment of the cradle bracket.) Note, that the mechanical method of connection between all plates in the preferred embodiment is by a bolt 10, washer 12 and nut 14 assembly, as discussed above although it is well known in the art that other equivalent connection methods such as pinning, riveting, welding or brazing may also be employed.

Figure 4:
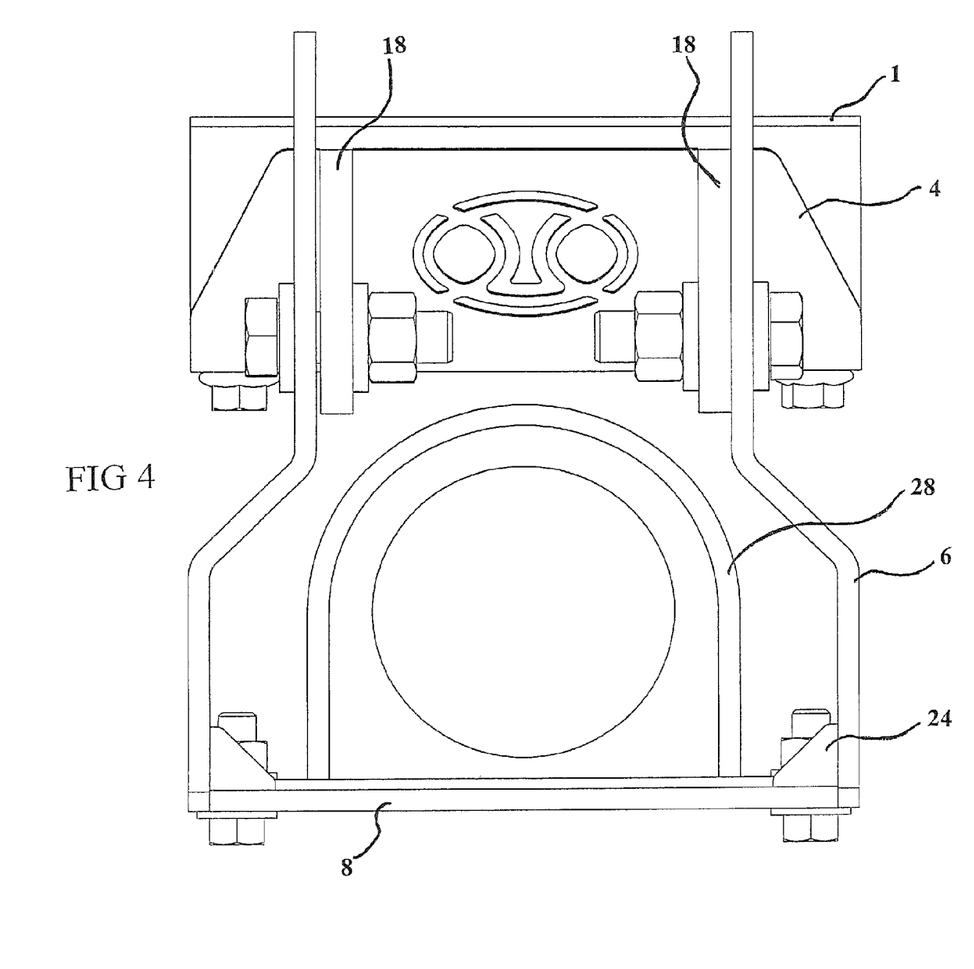
FIG. 4 is a side view of the adjustable vehicle driveline mount.
Figure 6:
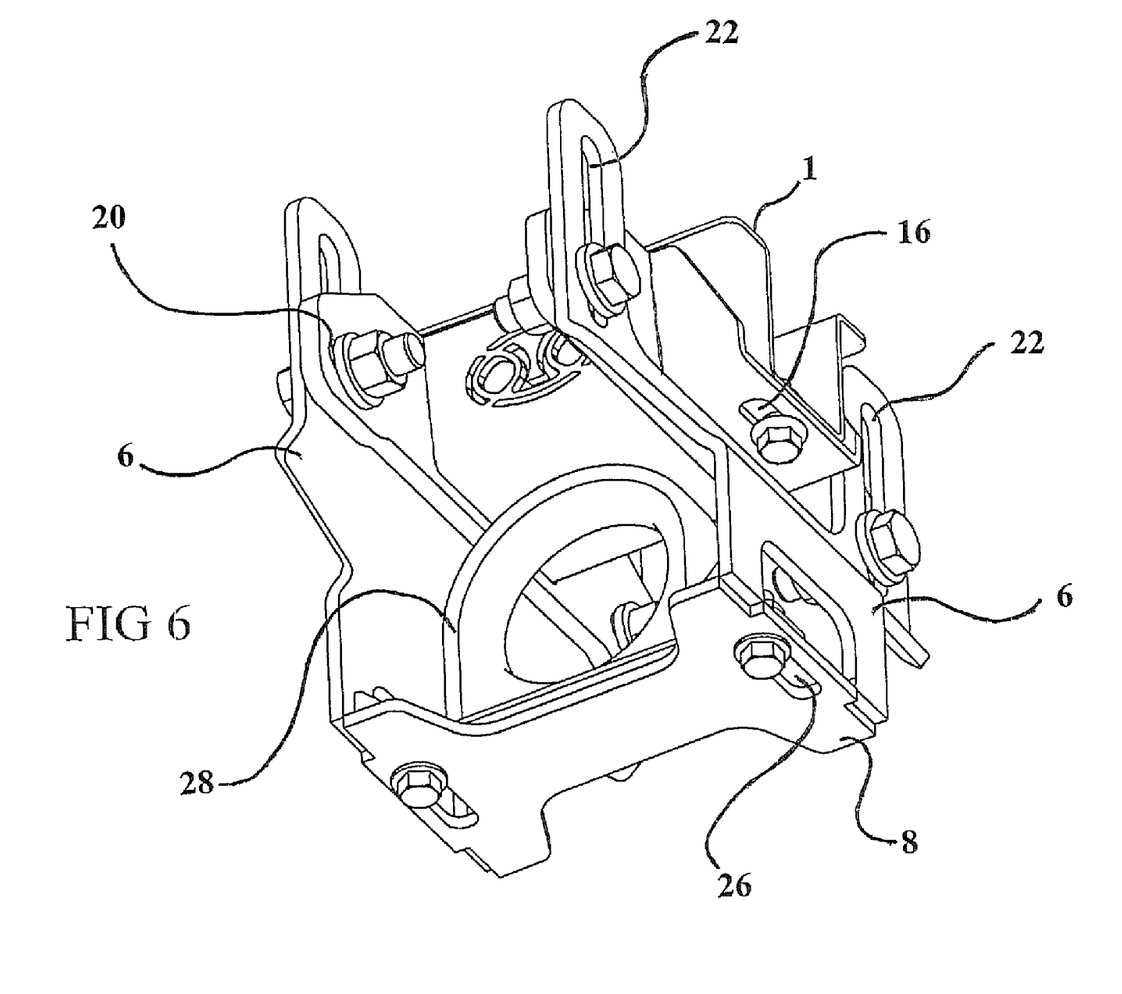
FIG. 6 is an angled bottom perspective view of the adjustable vehicle driveline mount.

Looking at FIGS. 4 and 6 the cradle bracket can be seen made up of two parallel side plates 6 attached perpendicular to and along the edges of the bottom plate 8. Assembly flanges 24 optionally may be utilized as a brace and/or welding point for the connection of the side plates 6 to the bottom plate 8. Each side plate 6 has two third elongated orifices 22 formed therein that are spatially mated to align with the elongated second orifices 20 in the connecting flanges of the top plate 4. The axis of elongation of the third orifices are vertical and reside in the XZ plane. A bolted connection joins the cradle bracket's side plates 6 to the top plate 4. This accommodates vertical and angular alignment of the cradle bracket with respect to the frame member 1.

The bottom plate 8 has two elongated fourth orifices 26 defined therein that are spatially orientated to align with the mounting hole found in standard carrier bearing assemblies 28. A bolted connector attaches the carrier bearing assembly 28 to the bottom plate 8. The axis of elongation resides horizontally in the XY plane and allows for the adjustment of the carrier bearing assembly 28 along the longitudinal axis of the driveshaft.

It is to be noted that all the bolted connectors used in the assembly and adjustment of the various plates above are dimensionally sized such that there is clearance between their outside diameters and the inside dimension of the various elongated orifices. In this manner there may be angular adjustment accomplished between the cradle bracket and the top plate 4, the top plate 4 and the cross member 1 and the carrier bearing assembly and the cradle bracket.

In use, the carrier bearing is located on the driveshaft and the driveshaft is connected to the vehicle's drivetrain at both the dirveshaft's distal and proximate ends. The carrier bearing assembly 28 is brought into proximity with the appropriate vehicle cross member 1. The top plate 4 is loosely bolted onto the cross member 1, the carrier bearing assembly 28 is loosely bolted onto the bottom plate 8, and the side plates 6 are loosely bolted onto the top plate 4. Ensuring that the driveshaft is aligned properly and that the inner contact surface of the carrier bearing normally and evenly contacts the outer surface of the driveshaft, all bolted connections may be tightened.

This design allows for an ample amount of three axis adjustment of the driveline mount as well as providing the minimal amount of distance between the cross member 1 and the carrier bearing assembly 28 by supporting the assembly 28 from below. This allows for a tremendous amount of both speed and flexibility in connection and adjustment. Since it is compatible with standard existing carrier bearing assemblies 28, existing vehicle components may be used.

Figure 7:
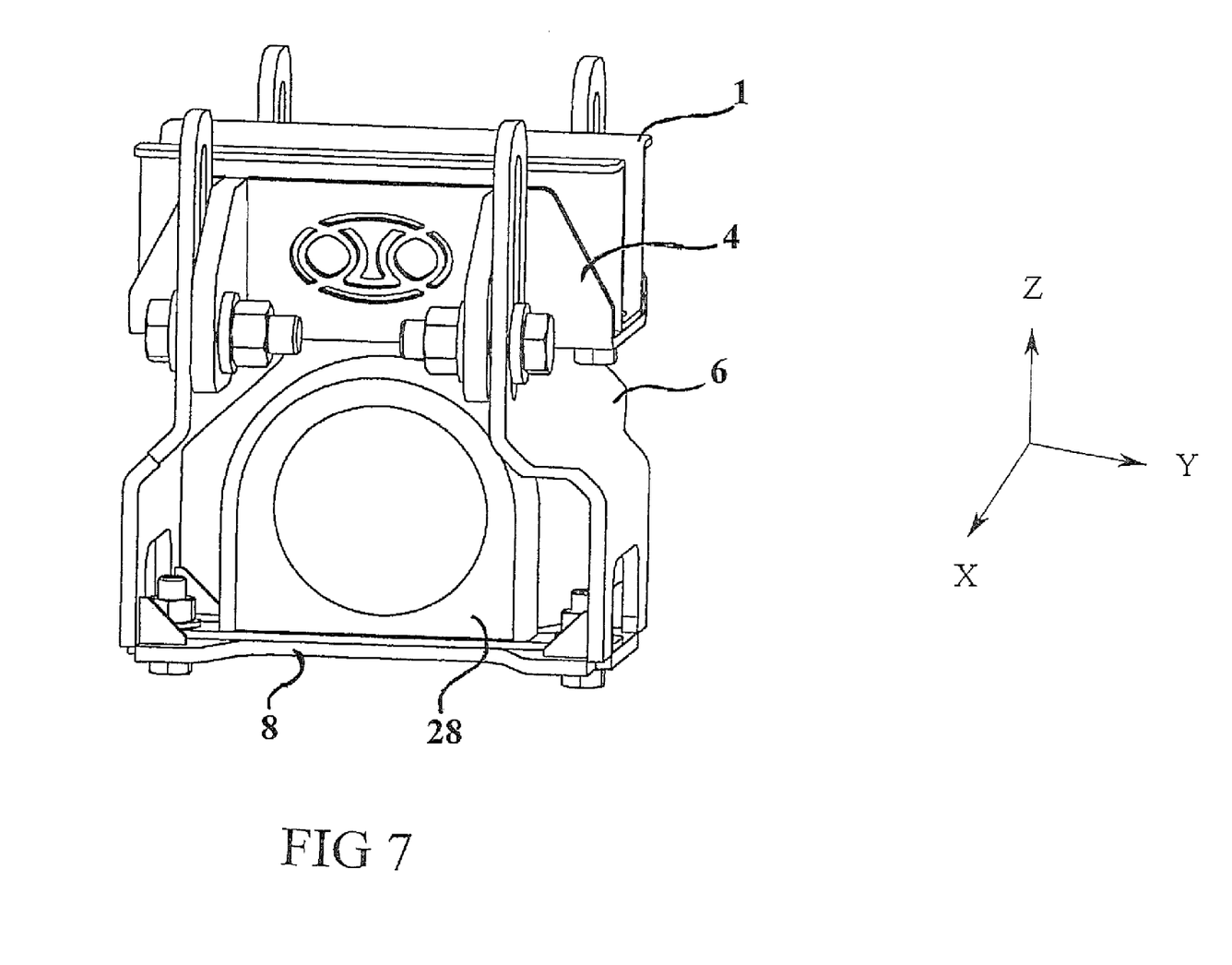
FIG. 7 is an angled end perspective view of the adjustable vehicle driveline mount.

Looking at FIG. 7 while adjustment of the carrier bearing assembly can be accommodated in any of the three axes (XYZ), any component of adjustment with respect to the Y axis is accomplished by the placement of the bracket 2 along the longitudinal axis of the frame rail cross member 1. The bracket 2 itself just accommodates adjustment in the X and Z axes by positioning of the various bracket parts relative to each other. The horizontal X axis adjustments are facilitated by the movement of the bolted carrier bearing assembly 28 in fourth elongated orifices 26 with respect to the bottom plate 8 or by the movement of the bolted U shaped channel member 4 in first elongated orifices 16 with respect to the frame cross member 1. The angular X axis adjustments of the carrier bearing assembly are facilitated by the offset movement of the bolted side plates 6 to the U shaped channel 4 through third elongated orifices 22 and elongated second orifices 20. The vertical Z axis adjustments of the carrier bearing assembly are facilitated by equidistant movement of the bolted side plates 6 to the U shaped channel 4 through third elongated orifices 22 and elongated second orifices 20.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A driveline support bracket having two separate horizontal alignment adjustment systems and one vertical alignment adjustment system for housing and supporting a driveshaft comprising:

a U shaped, top plate with a concave upper face and a convex lower face, having four generally planar projections that extend normal therefrom said lower face and wherein each said projection has an elongated first orifice defined therethrough, and said top plate having a first horizontal alignment adjustment system of at least one elongated second orifice formed therethrough, a three sided cradle assembly having a bottom plate and two side plates affixed in a spaced parallel configuration between said top plate and said bottom plate;

a carrier bearing assembly; and at least one mechanical connector;

wherein said top plate is mechanically connected to said side plates, and said bottom plate is mechanically connected to said side plates so as to form a four sided housing in which said carrier bearing assembly is affixed to a top side of said bottom plate.

2. The driveline support bracket of claim 1 wherein said side plates each have a vertical alignment adjustment system of two elongated third orifices formed therethrough that are matingly spaced to align with said first orifices.

3. The driveline support bracket of claim 2 wherein said bottom plate has a second horizontal alignment adjustment system of two oblong fourth orifices formed therethrough matingly spaced to align with mounting holes of said carrier bearing assembly so as to allow the horizontal adjustment of said carrier bearing assembly within said cradle assembly.

4. A vehicle driveshaft support bracket for attachment to a vehicle crossmember comprising:

a top plate having a linear, concave depression formed along a top face thereof two substantially similar side plates;

a bottom plate having two oblong bottom orifices formed therethrough;

a carrier bearing;

a carrier bearing mounting housing; and at least one mechanical fastener;

wherein said top plate and said bottom plate are held in a mechanically fastened and spaced configuration by two parallel said side plates, and said carrier bearing mounting housing constrains said carrier bearing and has two round orifices formed therein that are spatially aligned with said oblong bottom orifices so as to allow said carrier bearing mounting housing to be adjustably affixed to said bottom plate by said at least one mechanical fastener passing through said oblong bottom and said round orifices, and wherein said top plate has at least one first oblong orifice formed therethrough said depression, and has four generally planar projections that extend normal therefrom a lower face thereof, and wherein each said projection has a second oblong orifice defined therethrough.

5. The support bracket of claim 4 wherein said side plates each have two third oblong orifices formed therethrough that are matingly spaced to align with said second orifices.

6. The support bracket of claim 5 wherein a longitudinal axis of said first oblong orifices and a longitudinal axis of said oblong bottom orifices are substantially parallel, and wherein a longitudinal axis of said third oblong orifice resides substantially perpendicular to said longitudinal axes of said first and bottom oblong orifices.

7. The support bracket of claim 6 wherein said second oblong orifice has a longitudinal axis that is substantially perpendicular to said longitudinal axis of the third oblong orifice.

* * * * *